United States Patent
Takiguchi

[19]

[11] Patent Number: 6,059,681

[45] Date of Patent: May 9, 2000

[54] NEUTRAL CONTROL DEVICE OF AUTOMATIC TRANSMISSION

[75] Inventor: Masahiro Takiguchi, Fuji, Japan

[73] Assignee: Jatco Corporation, Japan

[21] Appl. No.: 09/222,093

[22] Filed: Dec. 29, 1998

[30] Foreign Application Priority Data

Jan. 22, 1998 [JP] Japan .................................. 10-010037

[51] Int. Cl.[7] ................................................. F16H 61/26
[52] U.S. Cl. ............................................................ 475/129
[58] Field of Search ........................... 475/129; 477/114, 477/117

[56] References Cited

U.S. PATENT DOCUMENTS

| | | | |
|---|---|---|---|
| 4,346,626 | 8/1982 | Kawamoto ............................... | 477/117 |
| 4,840,092 | 6/1989 | Sakaguchi et al. .................. | 477/114 X |
| 4,867,194 | 9/1989 | Hayasaki et al. .................... | 477/117 X |
| 5,246,407 | 9/1993 | Paulsen et al. .......................... | 475/129 |
| 5,431,608 | 7/1995 | Hirose .................................. | 475/129 X |

*Primary Examiner*—Sherry L. Estremsky

*Attorney, Agent, or Firm*—Rossi & Associates

[57] ABSTRACT

A neutral control device of an automatic transmission is provided which includes a forward-drive engaging element that is engaged when a hydraulic pressure is supplied from a shift valve, so as to place the transmission in at least a 1st-speed gear position of a forward-drive range, and in which the pressure to the forward-drive engaging element is controlled so as to establish a neutral condition by slipping and engaging the forward-drive engaging element, while an accelerator pedal is being released just before the start or stopping of the vehicle. The neutral control device includes a neutral control switch valve located in a hydraulic circuit that connects the forward-drive engaging element and the shift valve, for allowing a selected one of a pressure from the shift valve and an accumulator back pressure to be supplied to the forward-drive engaging element, a first actuator that operates to produce an oil pressure in response to a control command from a controller; accumulator back pressure control device for controlling the accumulator back pressure, using a forward-drive range pressure as an original pressure, and the oil pressure produced by the first actuator as a signal pressure, and a second actuator that operates in response to an ON/OFF command from the controller, so as to perform switching of the neutral control switch valve.

6 Claims, 13 Drawing Sheets

|  | REV/C | HIGH/C | 2-4/B | LOW/C | L&R/B | LOW O.W.C |
|---|---|---|---|---|---|---|
| 1st |  |  |  | ○ | (○) | ◐ |
| 2nd |  |  | ○ | ○ |  |  |
| 3rd |  | ○ |  | ○ |  |  |
| 4th |  | ○ | ○ |  |  |  |
| Rev | ○ |  |  |  | ○ |  |

| GEAR POSITION \ SOLENOID | SHIFT SOLENOID A | SHIFT SOLENOID B |
|---|---|---|
| 1st | ○ | ○ |
| 2nd | × | ○ |
| 3rd | × | × |
| 4th | ○ | × |

○ ··· ON (Drain Circuit closed)
× ··· OFF (Drain Circuit open)

Prior Art

Fig. 15

NEUTRAL CONTROL DEVICE OF AUTOMATIC TRANSMISSION

BACKGROUND OF THE INVENTION

1. Field of the Invention

The present invention relates to a neutral control device of an automatic transmission that establishes a neutral condition by slipping and engaging a forward-drive engaging element while an accelerator pedal is being released just before the start or stop of the vehicle.

2. Description of the Prior Art

Figure 14:
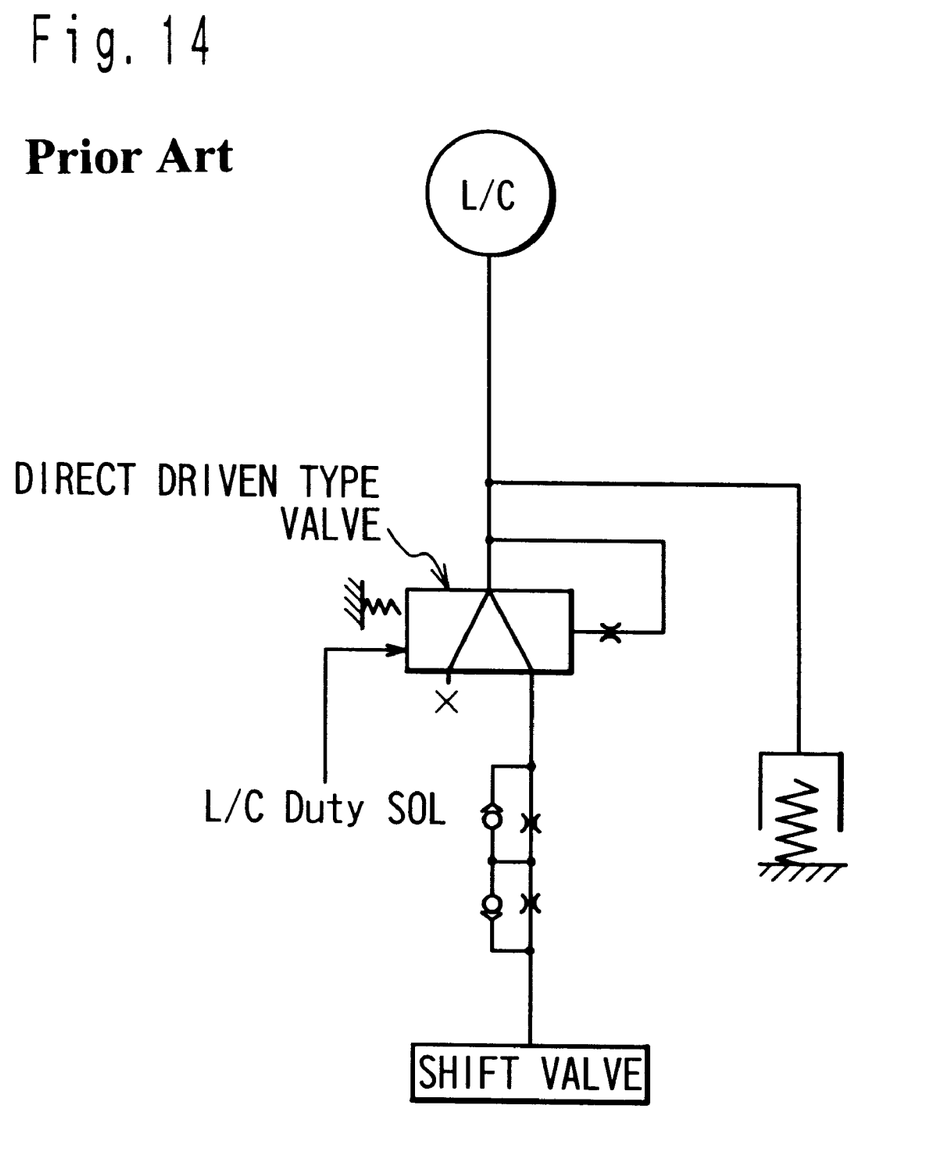
FIG. 14 is a view showing a principal portion of a known neutral control device including a direct driven type valve.

A known example of neutral control device of an automatic transmission is disclosed in Japanese laid-open Patent Publication No. 61-85225. In this known device, as shown in FIG. 14, a direct driven type valve that is driven by a low clutch pressure duty solenoid so as to control a low clutch pressure is provided in a hydraulic circuit that connects a shift valve, and a low clutch that is engaged when a hydraulic pressure is supplied from the shift valve so as to place the transmission in at least the 1st-speed gear position in the forward-drive range.

In the known neutral control device of the automatic transmission as described above, however, the low clutch pressure is controlled by the direct drive type valve in a range of oil pressure level from zero to the maximum level (line pressure), and therefore the gain of the oil pressure becomes considerably large, which tends to cause vibrations or variations in the oil pressure. Thus, the direct driven type valve is not suitable for use in neutral control that requires subtle control of the low clutch pressure.

The known neutral control device has another problem; if the low clutch pressure duty solenoid locks, or fails, while the direct driven type valve is placed in a drain position, the low clutch fails to be engaged in the forward-drive 1st-, 2nd-, and 3rd-gear positions in which it should be engaged, and the vehicle is unable to run due to racing of the engine.

Figure 15:
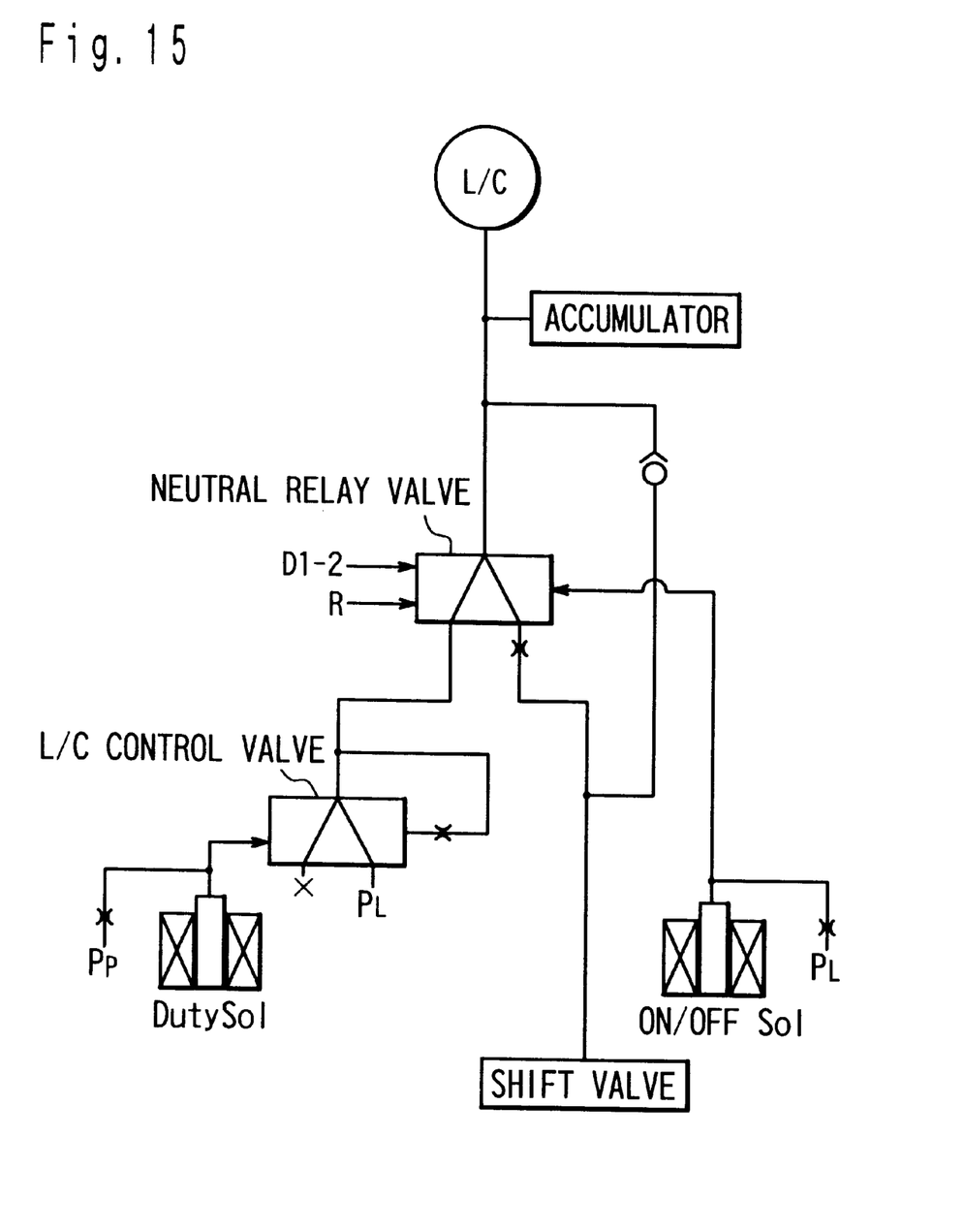
FIG. 15 is a view showing a neutral control device of control valve type.

In view of the above problems, it is proposed to provide a neutral control device that performs neutral control by using an oil pressure obtained from a low clutch control valve using the line pressure as an original pressure, as shown in FIG. 15, instead of using the pressure of the shift valve.

Although this neutral control device solves the above-described problem, two valves and two solenoids are newly added so as to perform neutral control, which is undesirable in view of the cost, and the addition of these valves makes it difficult to lay out the circuit including the shift valve.

Since the low clutch control valve uses the line pressure as the original pressure, as described above, the oil pressure may be supplied from the low clutch control valve to the low clutch due to a failure in the solenoid even where the neutral position is selected, thus allowing the vehicle to run in the N range.

SUMMARY OF THE INVENTION

It is therefore an object of the present invention to provide a neutral control device of an automatic transmission, which requires a reduced number of components to be added to perform neutral control, and is free from vibrations or variations in the oil pressure during the neutral control, while ensuring running of the vehicle in the forward-drive range and avoiding vehicle running in a range other than the forward-drive range upon a failure in the operation of the device.

Figure 1:
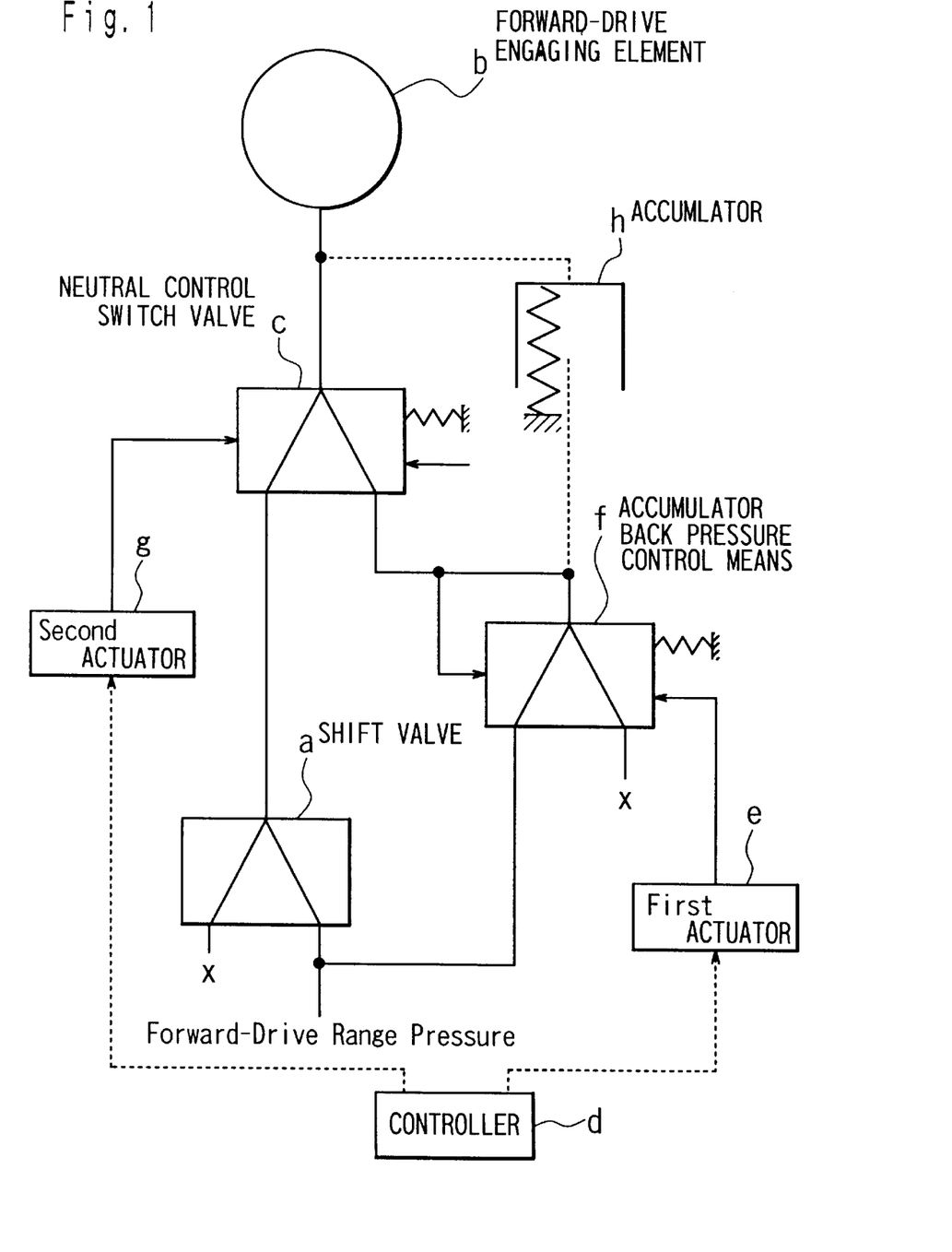
FIG. 1 is a view schematically showing a neutral control device of an automatic transmission constructed according to the present invention.

To accomplish the above object, a neutral control device of an automatic transmission as shown in FIG. 1 is provided, which includes a forward-drive engaging element "b" that is engaged when a hydraulic pressure is supplied from a shift valve "a", so as to place the transmission in at least a 1st-speed gear position of a forward-drive range; neutral control means for controlling the hydraulic pressure to be supplied to the forward-drive engaging element, so as to establish a neutral condition by slipping and engaging the forward-drive engaging element "b" in the forward-drive range, while an accelerator pedal is being released during a range selecting operation to start the vehicle, or during a braking operation to stop the vehicle; a neutral control switch valve "c" located in a hydraulic circuit that connects the forward-drive engaging element "b" and the shift valve "a", for allowing a selected one of a pressure from the shift valve and an accumulator back pressure to be supplied to the forward-drive engaging element "b"; a first actuator "e" that operates to produce an oil pressure in response to a control command from a controller "d"; accumulator back pressure control means "f" for controlling the accumulator back pressure, using a forward-drive range pressure as an original pressure, and the oil pressure produced by the first actuator "e" as a signal pressure; and a second actuator "g" that operates in response to an ON/OFF command from the controller "d", so as to perform switching of the neutral control switch valve "c".

The neutral control device constructed as described above requires a reduced number of components to be added to perform neutral control, and vibrations or variations in the oil pressure are less likely to occur during the neutral control. Further, even if the device fails, the vehicle is surely able to run in the forward-drive range, and is inhibited from running in a range other than the forward-drive range.

In the neutral control device as described above, an oil pressure generated in response to an ON command to the second actuator "g" may be applied to the neutral control switch valve "c", so that the accumulator back pressure is supplied to the forward-drive engaging element "b", and an oil pressure generated in a gear position in which the forward-drive engaging element "b" is released may be applied to the neutral control switch valve, so that the pressure of the shift valve is supplied to the forward-drive engaging element.

In addition to the advantages as described above, this arrangement can prevent interlocking when the device fails, namely, prevents the forward-drive engaging element from being engaged in a gear position in which the engaging element should be released.

In one preferred form of the invention, an accumulator "h" is provided between the neutral control switch valve "c" and the forward-drive engaging element "b", and the accumulator back pressure control means "f" controls a back pressure of the accumulator "h".

In addition to the advantages as described above, the accumulator provided in the hydraulic circuit connected to the forward-drive engaging element functions as a vibration damping actuator during the neutral control, and thus advantageously reduces vibrations in the oil pressure.

In another preferred form of the invention, the accumulator back pressure control means "f" controls a back pressure of a accumulator which is provided in a hydraulic circuit that is connected to an engaging element other than the forward-drive engaging element.

In addition to the advantages as described above, the elimination of the accumulator leads to reduction in the cost, and simplification of the layout of the circuit configuration.

In a further preferred form of the invention, a first accumulator is provided between the neutral control switch valve "c" and the forward-drive engaging element "b", and a second accumulator is provided in a hydraulic circuit connected to an engaging element other than the forward-drive engaging element. In this case, the accumulator back pressure control means "f", controls a back pressure of the second accumulator.

In addition to the advantages as described above, the forward-drive engaging element pressure is prevented from being discharged in the gear position in which the forward-drive engaging element is to be engaged, thus assuring a fail-safe operation.

In another preferred form of the invention, a first accumulator is provided between the shift valve and the neutral control switch valve, and a second accumulator is provided in a hydraulic circuit connected to an engaging element other than the forward-drive engaging element. In this case, the accumulator back pressure control means controls a back pressure of the second accumulator.

In addition to the advantages as described above, the operation of the accumulator may be ignored during the neutral control, and thus the neutral control can be easily performed.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

A neutral control device of an automatic transmission according to one embodiment of the present invention will be described in detail.

Figure 2:
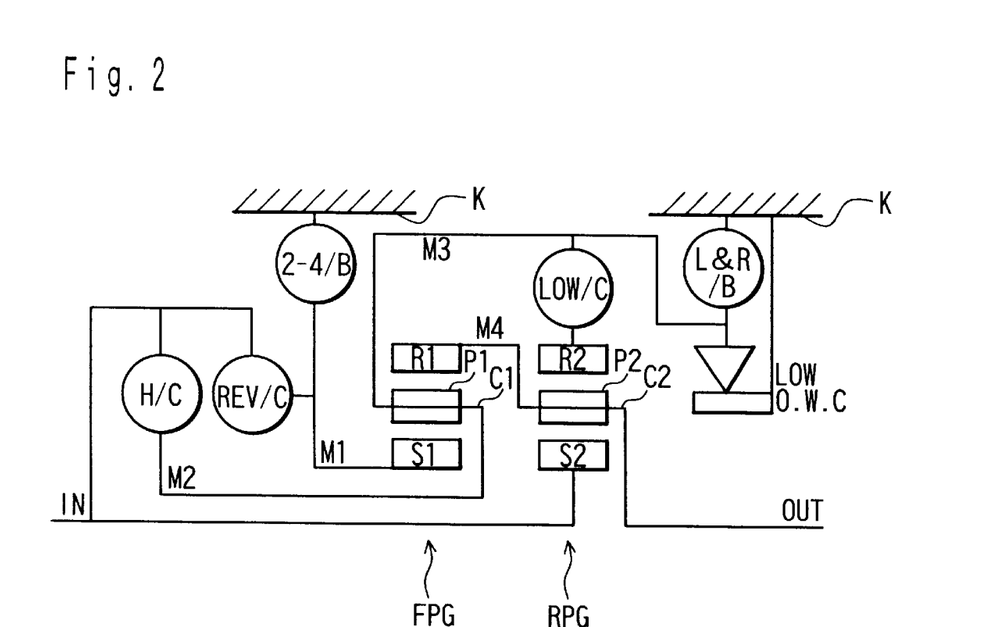
FIG. 2 is a view schematically showing a power transmitting system of the automatic transmission in which a neutral control device according to the first embodiment of the invention is employed.

Initially, the whole construction of the automatic transmission that includes the neutral control device of the first embodiment will be described, referring to FIG. 2 that schematically shows a power transmitting system of the transmission. As shown in FIG. 2, the power transmitting system includes an input shaft IN, an output shaft OUT, a front planetary gear mechanism FPG, and a rear planetary gear mechanism RPG. The front planetary gear mechanism FPG includes a first sun gear S1, first ring gear R1, first pinion P1, and a first pinion carrier C1. The rear planetary gear mechanism RPG includes a second sun gear S2, second ring gear R2, second pinion P2, and a second pinion carrier C2.

Engaging elements for establishing forward 4-speed, reverse 1-speed gear positions by using the above-described gear train arrangement include a reverse clutch REV/C (hereinafter referred to as R/C), high clutch HIGH/C (hereinafter referred to as H/C), 2-4 brake 2-4/B, low clutch LOW/C (hereinafter referred to as L/C), low & reverse brake L&R/B, and a low one-way clutch LOW O.W.C.

The first sun gear S1 is connected to the input shaft IN through a first rotary member M1 and the reverse clutch R/C, and also connected to a transmission case K through the first rotary member M1 and the 2-4 brake 2-4/B.

The first carrier C1 is connected to the input shaft IN through a secondary rotary member M2 and the high clutch H/C, and also connected to the transmission case K through a third rotary member M3 and the low & reverse brake L&R/B. Further, the first carrier C1 is connected to the second ring gear R2 through the third rotary member M3 and the low clutch L/C. The low one-way clutch LOW O.W.C. is disposed in parallel with the low & reverse brake L&R/B.

The first ring gear R1 is connected directly to the second carrier C2 through a fourth rotary member M4, and the output shaft OUT is connected directly to the second carrier C2. The second sun gear S2 is connected directly to the input shaft IN.

This power transmitting system is characterized in that it does not include a one-way clutch for controlling the shift timing so as to eliminate shift shocks upon downshifting from the 4th-speed to 3rd-speed gear position, and a hydraulically operated clutch that is needed for ensuring the effect of engine brakes when the one-way clutch is used. Due to elimination of these clutches, the number of engaging elements is reduced, which leads to reduced size and weight of the power transmitting system.

Figure 3:
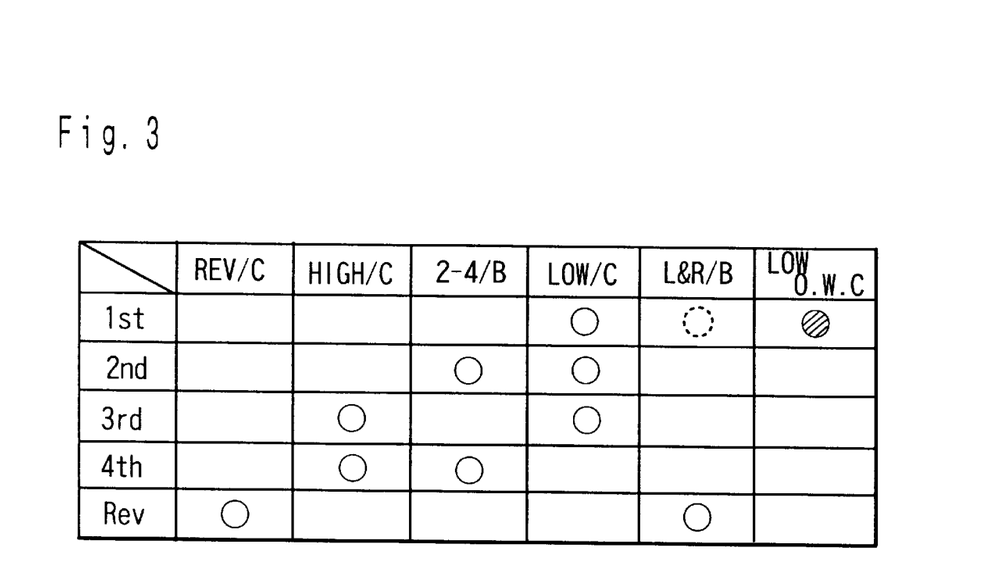
FIG. 3 is a table showing engaged and unengaged states of engaging elements of the automatic transmission in which the neutral control device of the first embodiment is used.

FIG. 3 is a table showing engaged and unengaged states of the engaging elements of the above-described power transmitting system for establishing the forward 4-speed, reverse 1-speed gear positions.

The 1st-speed gear position is established by hydraulically engaging the low clutch L/C, and hydraulically engaging the low & reverse brake L&R/B (when an engine brake range is selected) or mechanically engaging the low one-way clutch LOW O.W.C. (when the vehicle is accelerated). In this case, the second sun gear S2 is connected to the input shaft IN, and the second ring gear R2 is fixed, while the second carrier C2 is connected to the output shaft OUT.

The 2nd-speed gear position is established by hydraulically engaging the low clutch L/C and the 2-4 brake 2-4B. In this case, the second sun gear S2 is connected to the input shaft IN, and the first sun gear S1 is fixed, while the second carrier C2 is connected to the output shaft OUT.

The 3rd-speed gear position is established by hydraulically engaging the high clutch H/C and the low clutch L/C. In this case, the second ring gear R2 and second sun gear S2 are concurrently connected to the input shaft IN, and the second carrier C2 is connected to the output shaft OUT, so that the transmission gear ratio becomes equal to The 4th-speed gear position is established by hydraulically engaging the high clutch H/C and the 2-4 brake 2-4/B. In this case, the first carrier C1 and second sun gear S2 are connected to the input shaft IN, and the first sun gear S1 is fixed, while the second carrier C2 is connected to the output shaft OUT, so as to establish the overdrive gear position.

The reverse gear position is established by hydraulically engaging the reverse clutch REV/C and the low & reverse brake L&R/B. In this case, the first and second sun gears S1, S2 are connected to the input shaft IN, and the first carrier C1 is fixed, while the second carrier C2 is connected to the output shaft OUT.

The 2-4 brake 2-4/B is a multiple-disc brake that is constructed similarly to a multiple-disc clutch.

Figure 4:
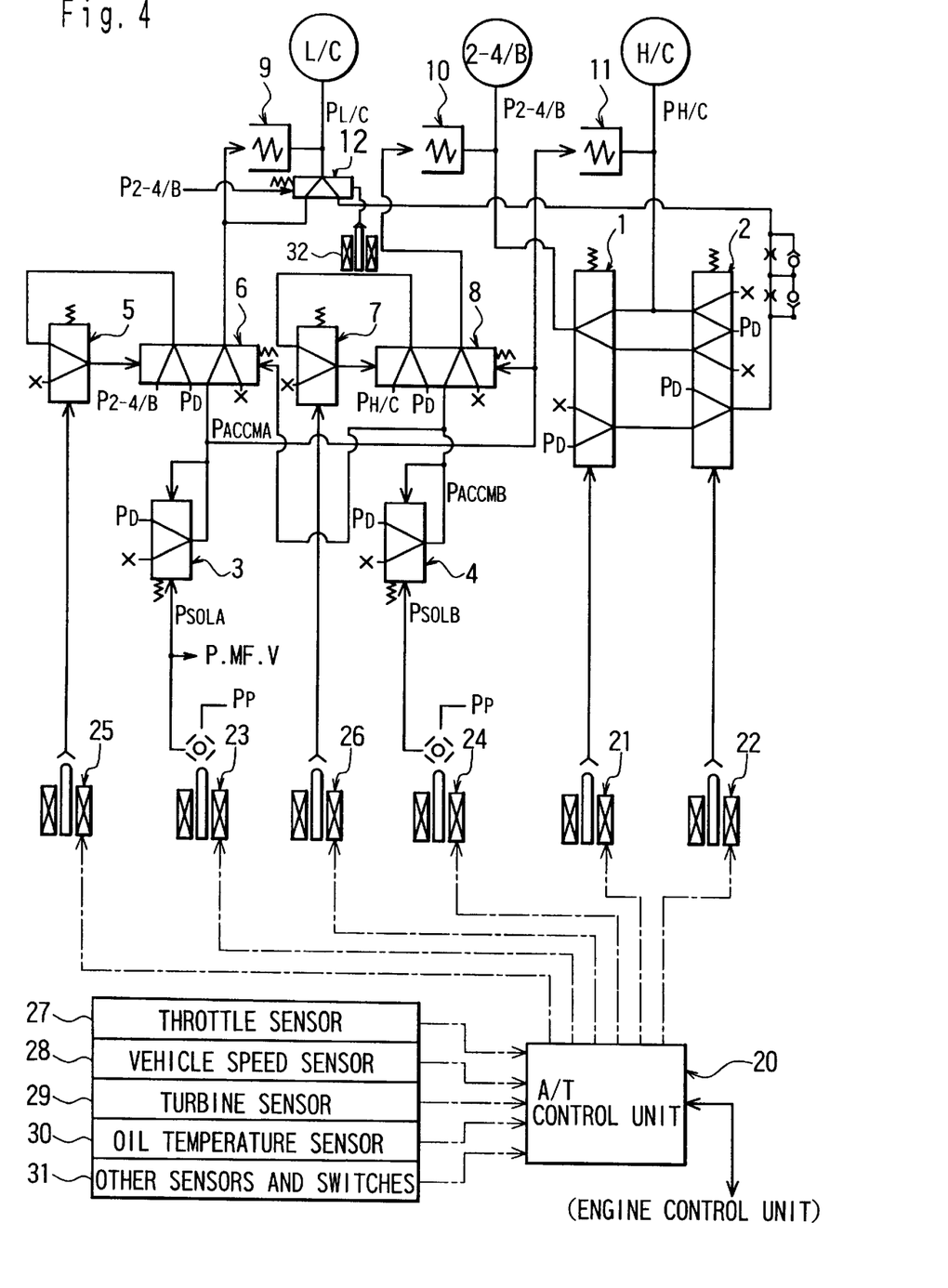
FIG. 4 is a diagram showing the whole control system including a hydraulic control portion and an electronic control portion, in which the neutral control device of the first embodiment is used.

FIG. 4 is a control system diagram showing a control valve portion, an electronic control portion, and engaging elements for automatically shifting the transmission to establish one of the above-indicated 1st-speed to 4th-speed gear positions in the D (drive) range.

In FIG. 4, the low clutch L/C, 2-4 brake 2-4/B, and the high clutch H/C are provided as engaging elements. The low clutch L/C corresponds to the above-indicated forward drive engaging element "b".

The control valve portion of FIG. 4 includes a shift valve (A) 1, shift valve (B) 2, accumulator control valve (A) 3, accumulator control valve (B) 4, low clutch timing valve 5, low clutch sequence valve 6, 2-4 brake timing valve 7, 2-4 brake sequence valve 8, low clutch accumulator 9, 2-4brake accumulator 10, and a high clutch accumulator 11. The shift valve (B) 2 corresponds to the above-indicated shift valve "a", and the accumulator control valve (A) 3, low clutch timing valve 5 and the low clutch sequence valve 6 correspond to the above-indicated accumulator back pressure control means "f", while the accumulator 9 corresponds to the above-indicated accumulator "h".

The shift valve (A) 1 and shift valve (B) 2 are adapted to switch oil paths to establish each of the 1st-speed to 4th-speed (overdrive) gear positions in response to the operations of a shift solenoid (A) 21 and a shift solenoid (B) 22, respectively.

The accumulator control valve (A) 3 reduces a D range pressure PD depending upon the level of a solenoid pressure PSOLA produced by a line pressure duty solenoid 23 (corresponding to the above-indicated first actuator "e"), so as to produce an accumulator control pressure (A) PACCMA. The solenoid pressure PSOLA produced by the line pressure duty solenoid 23 is also led to a pressure modifier valve adapted to produce a modifier pressure that serves as a signal pressure for a line pressure PL produced by a pressure regulator valve that is not illustrated in FIG. 4.

The accumulator control valve (B) 4 reduces the D range pressure PD depending upon the level of a solenoid pressure PSOLB produced by a 2-4/B duty solenoid 24, so as to produce an accumulator control pressure (B) PACCMB.

The low clutch timing valve 5 is a switch valve that drains a signal pressure oil path when a low clutch timing solenoid 25 is OFF, and produces an oil pressure for communication of the signal pressure oil path when the solenoid 25 is ON. The low clutch sequence valve 6 is adapted to control the back pressure of the low clutch accumulator 9 upon upshifting to the 4th-speed gear position or downshifting from the 4th-speed gear position.

The 2-4 brake timing valve 7 is a switch valve that drains a signal pressure oil path when a 2-4 brake timing solenoid 26 is OFF, and produces an oil pressure for communication of the signal pressure oil path when the solenoid 26 is ON. The 2-4 brake sequence valve 8 is adapted to control the back pressure of the 2-4 brake accumulator 10 upon upshifting to the 3rd-speed gear position or downshifting from the 3rd-speed gear position.

The low clutch accumulator 9 has a back pressure chamber to which the accumulator control pressure (A) PACCMA is applied through the low clutch sequence valve 6, so as to smoothly engage and release the low clutch L/C. The 2-4 brake accumulator 10 has a back pressure chamber to which the accumulator control pressure (B) PACCMB is applied through the 2-4 brake sequence valve 8, so as to smoothly engage and release the 2-4 brake 2-4/B. The high clutch accumulator 11 has a back pressure chamber to which the accumulator control pressure (A) PACCMA is directly applied, so as to smoothly engage and release the high clutch H/C.

The control valve portion of FIG. 4 further includes a neutral control valve 12 (corresponding to the above-indicated neutral control switch valve "c"), and a neutral control solenoid 32 (corresponding to the above-indicated second actuator "g"), which are newly added to perform neutral control operations.

The neutral control valve 12 is located in a hydraulic circuit that connects the low clutch L/C and the shift valve (B) 2, and serves to switch the low clutch pressure between the shift valve pressure and the accumulator back pressure, namely apply a selected one of the shift valve pressure and the accumulator back pressure to the low clutch L/C. In operation, an oil pressure produced in response to an ON command to the neutral control solenoid 32 is applied to the neutral control valve 12 in a direction to apply the accumulator back pressure to the low clutch, and a 2-4 brake pressure produced in the 4th-speed gear position for releasing the low clutch L/C is applied to the neutral control valve 12 in a direction to apply the shift valve pressure to the low clutch. The low clutch accumulator 9 is located between the neutral control valve 12 and the low clutch L/C, and the accumulator control valve (A) 3 serves to control the accumulator control pressure (A) PACCMA of the low clutch accumulator 9.

The neutral control solenoid 32 is an actuator for switching or operating the neutral control valve 12 in response to an ON/OFF command from an A/T control unit 20 (corresponding to the above-indicated controller "d").

In the electronic control portion of FIG. 4, the shift solenoid (A) 21, shift solenoid (B) 22, line pressure duty solenoid 23, 2-4/B duty solenoid 24, low clutch timing solenoid 25, 2-4/B timing solenoid 26, and the neutral control solenoid 32 are provided as actuators for controlling oil pressures according to drive commands generated by the A/T control unit 20.

The A/T control unit 20 receives as input information various signals from various sensors, such as a throttle sensor 27 for detecting the throttle opening of a throttle valve, a vehicle speed sensor 28 for detecting the vehicle speed, a turbine sensor 29 for detecting the rotating speed of a turbine runner, an oil temperature sensor 30 for detecting the oil temperature, and other sensors and switches 31.

Figure 5:
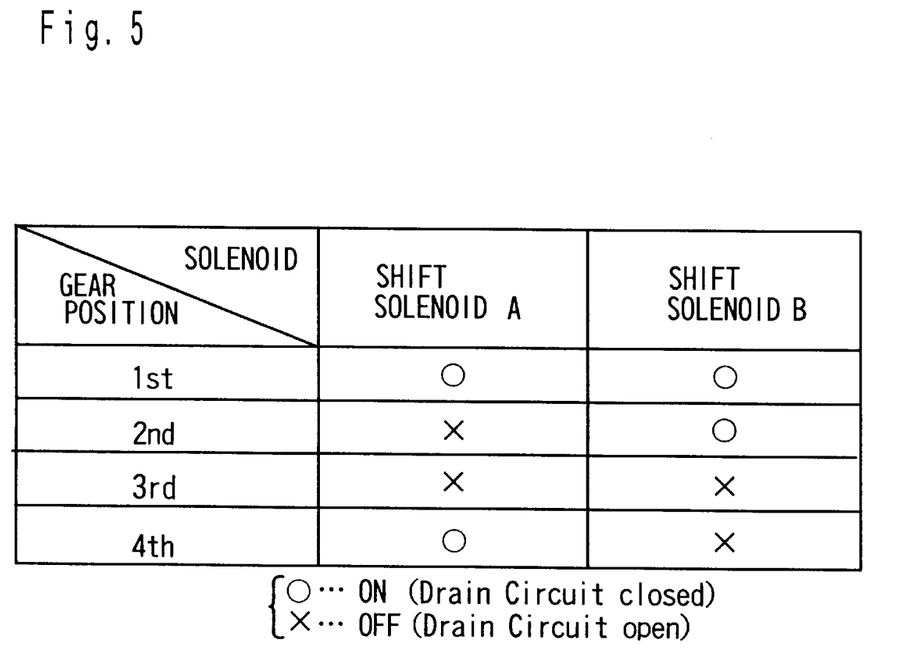
FIG. 5 is a table showing operating states of shift solenoids of the automatic transmission of the first embodiment.
Figure 6:
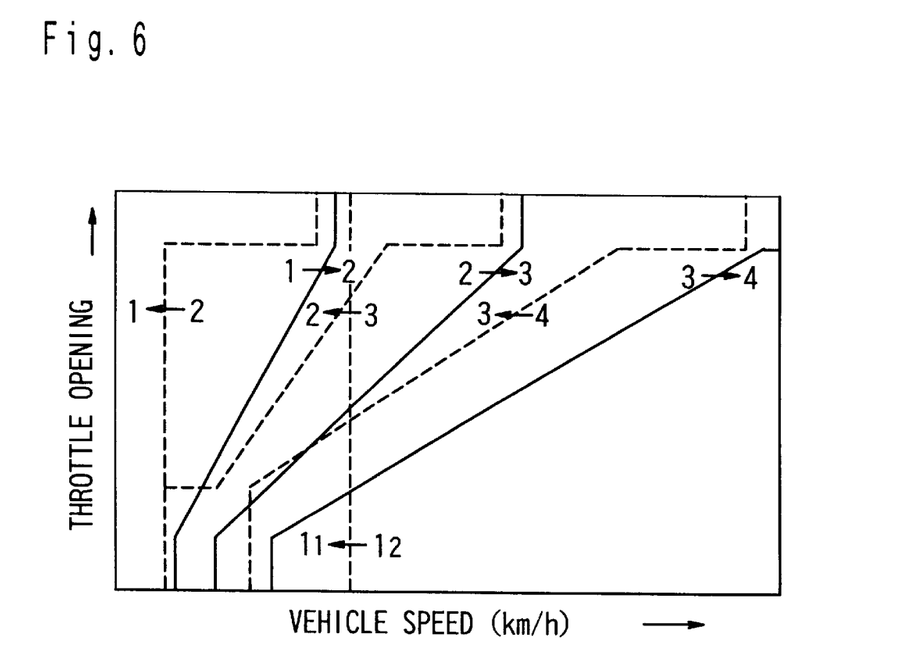
FIG. 6 is a view showing an example of gear change point characteristics of the automatic transmission of the first embodiment.

To perform shift control for automatically shifting the transmission from one of the 1st-speed to 4th-speed gear positions to another in the D (drive) range, a gear change command is first generated based on the graph of FIG. 6 indicating gear change points in relation to the throttle opening and vehicle speed detected by the sensors 27, 28, when the current point (relationship between the throttle opening and the vehicle speed) on the graph passes one of upshifting and downshifting lines, and the gear position to which the transmission should be shifted is determined by this gear change command. To establish the thus determined gear position, the A/T control unit 20 generates an ON- or OFF-command to each of the shift solenoid (A) 21 and shift solenoid (B) 22, according to the table of FIG. 5 indicating the operated states of the shift solenoids.

The operation of the present embodiment will be now described.

N-D Control Upon Start of Vehicle

Referring to timing charts of FIG. 7 and FIG. 8, there will be described one example of neutral control for preventing creeping of the vehicle, which is performed upon selecting from the N range to the D range with the accelerator pedal being released, until the time when the acceleration pedal is depressed and the vehicle starts running.

Figure 7:
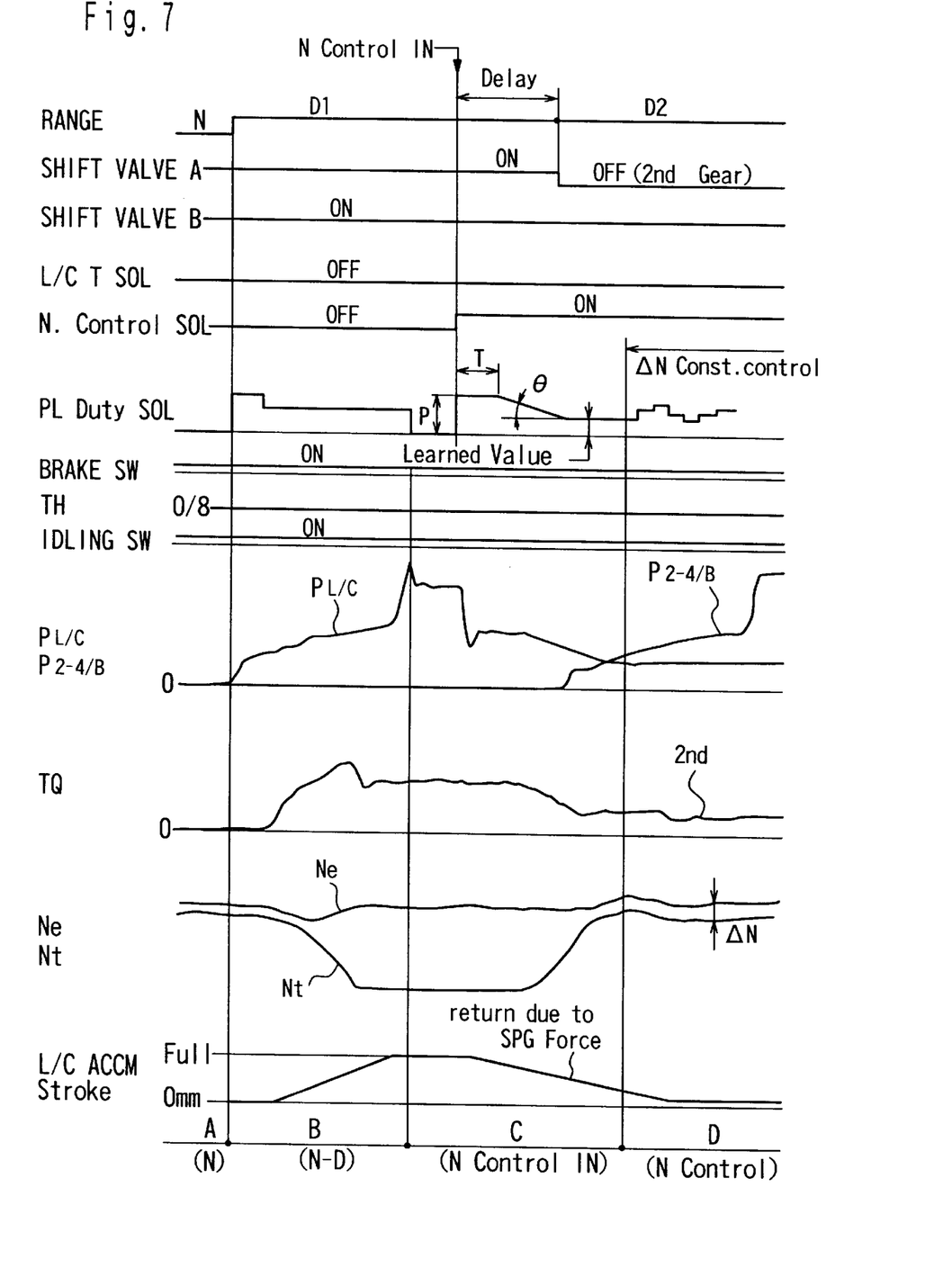
FIG. 7 is a time chart of neutral control performed upon a change from N range to D range for starting the vehicle.
Figure 8:
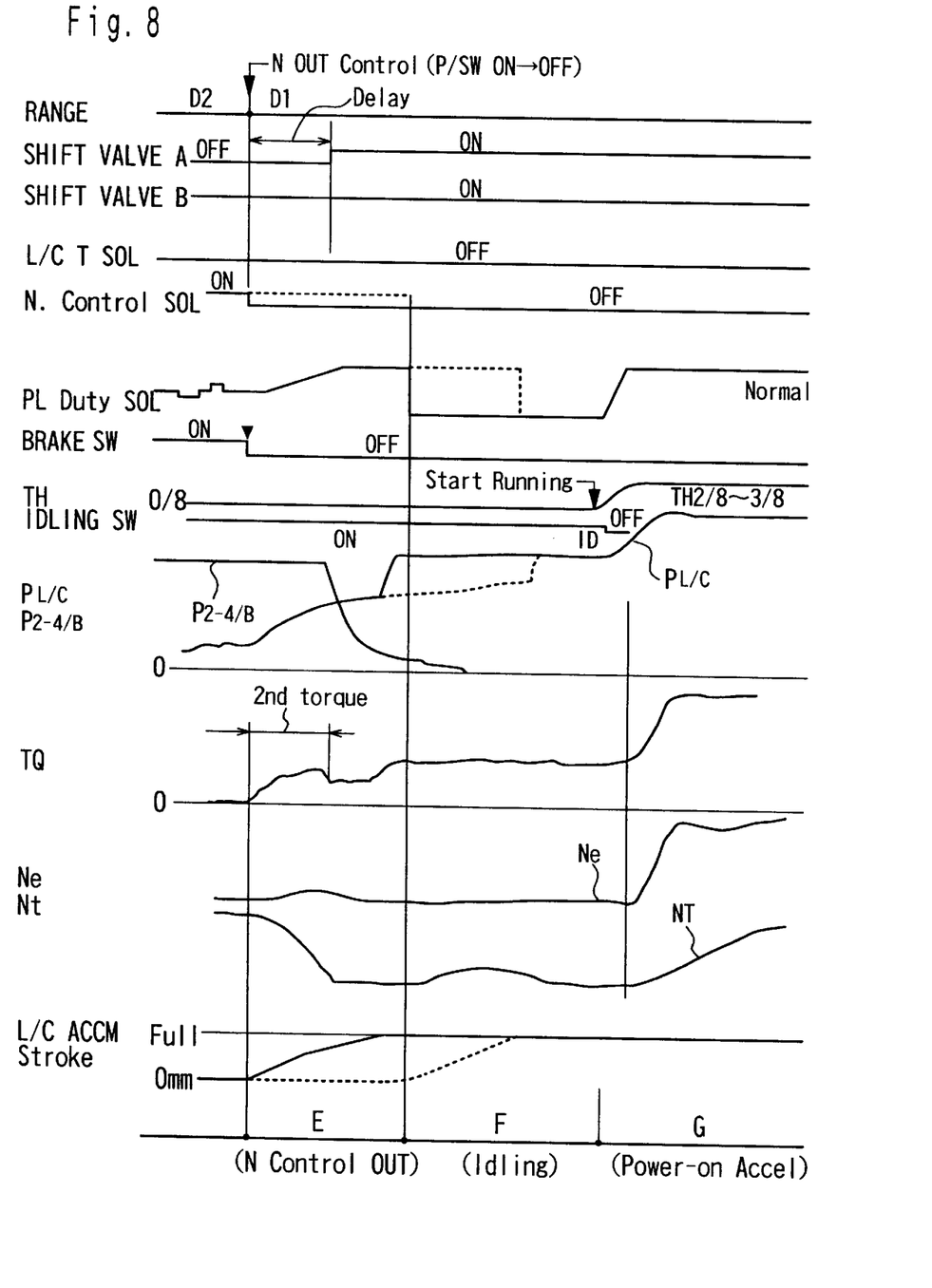
FIG. 8 is a time chart of neutral control performed upon a change from N range to D range for starting the vehicle.

Suppose the select lever is operated from the N range as indicated by "A" region in FIG. 7, to the D range. In the N-D region ("B" region in FIG. 7) corresponding to the 1st-speed gear position of the D range, the low clutch pressure PL/C is increased in response to a command to increase the duty ratio of the line pressure duty solenoid 23 (PL Duty SOL) from the value at the time of selecting the D range, and the transmission torque TQ is increased with a delay. Also, the turbine speed NT is lowered, and the piston of the low clutch accumulator 9 makes a full stroke of movement.

In the next region (C region in FIG. 7) after the duty ratio of the line pressure duty solenoid 23 returns to zero, the neutral control solenoid 32 is turned on at a point of time when the timer value counted from the time of selecting the D range becomes equal to a preset value, or at a point of time when the turbine speed NT becomes equal to or lower than a preset speed. As a result, the accumulator back pressure is led to the low clutch L/C, and the neutral control is started. In the neutral control, the duty ratio of the line pressure duty solenoid 23 is raised to level P, kept at this level for a predetermined period of time T, and then gradually reduced along a slope having an angle θ, to thus provide a control start characteristic that keeps the duty ratio at a learned value. As a result, the low clutch pressure PL/C is lowered, and the transmission torque TQ is reduced, while the turbine speed NT is increased, so that the piston of the low clutch accumulator 9 returns to its original position only due to its spring force. Upon a lapse of a delay time as counted from the start of the neutral control, the transmission is shifted to the 2nd-speed gear position of the D range, and the 2-4 brake pressure P2-4/B starts increasing.

In the region (D region in FIG. 7) after a rotating speed difference ΔN between the engine speed Ne and the turbine speed NT becomes equal to a predetermined value, a neutral control routine is executed in which the duty ratio of the line pressure duty solenoid 23 is varied so as to keep the rotating speed difference ΔN at a constant value, so that the low clutch pressure PL/C is controlled to a level that permits slip engagement of the low clutch L/C.

In the next region (E region in FIG. 8) that lasts for a certain period of time from the point of time when the brake pedal is released, the neutral control solenoid 32 is turned off, so that the shift valve pressure from the shift valve (B) 32 is led or supplied to the low clutch L/C, and thus the neutral control is finished. In this control end region, the duty ratio that provides a control end characteristic is given to the line pressure duty solenoid 23, as in the control start region. In this manner, the low clutch pressure PL/C is increased, and the transmission torque TQ is increased, while the turbine speed NT is lowered. In this neutral control end region, the transmission is shifted to the 1st-speed gear position of the D range upon a lapse of a delay time from the brake releasing operation, and the 2-4 brake pressure P2-4/B starts decreasing due to the downshifting to the 1st-speed gear position. During the neutral control end region, however, the neutral control solenoid 32 may be kept ON as shown by dotted line, so that the accumulator back pressure is supplied to the low clutch L/C.

In an idle region (F region in FIG. 8) in which the acceleration pedal is kept being released after the neutral control end region, normal line pressure control according to the angle of the acceleration pedal (or throttle opening) is performed on the line pressure duty solenoid 23. In this idle region, too, the duty ratio given to the line pressure duty solenoid 23 may be kept at a high value, as indicated by a dotted line in FIG. 8.

In a power-on acceleration region (G region in FIG. 8) in which the acceleration pedal is depressed so as to start the vehicle, line pressure control according to the angle of the accelerator pedal (or throttle opening) is performed on the line pressure duty solenoid 23.

D-N Control Upon Stop of Vehicle

Figure 9:
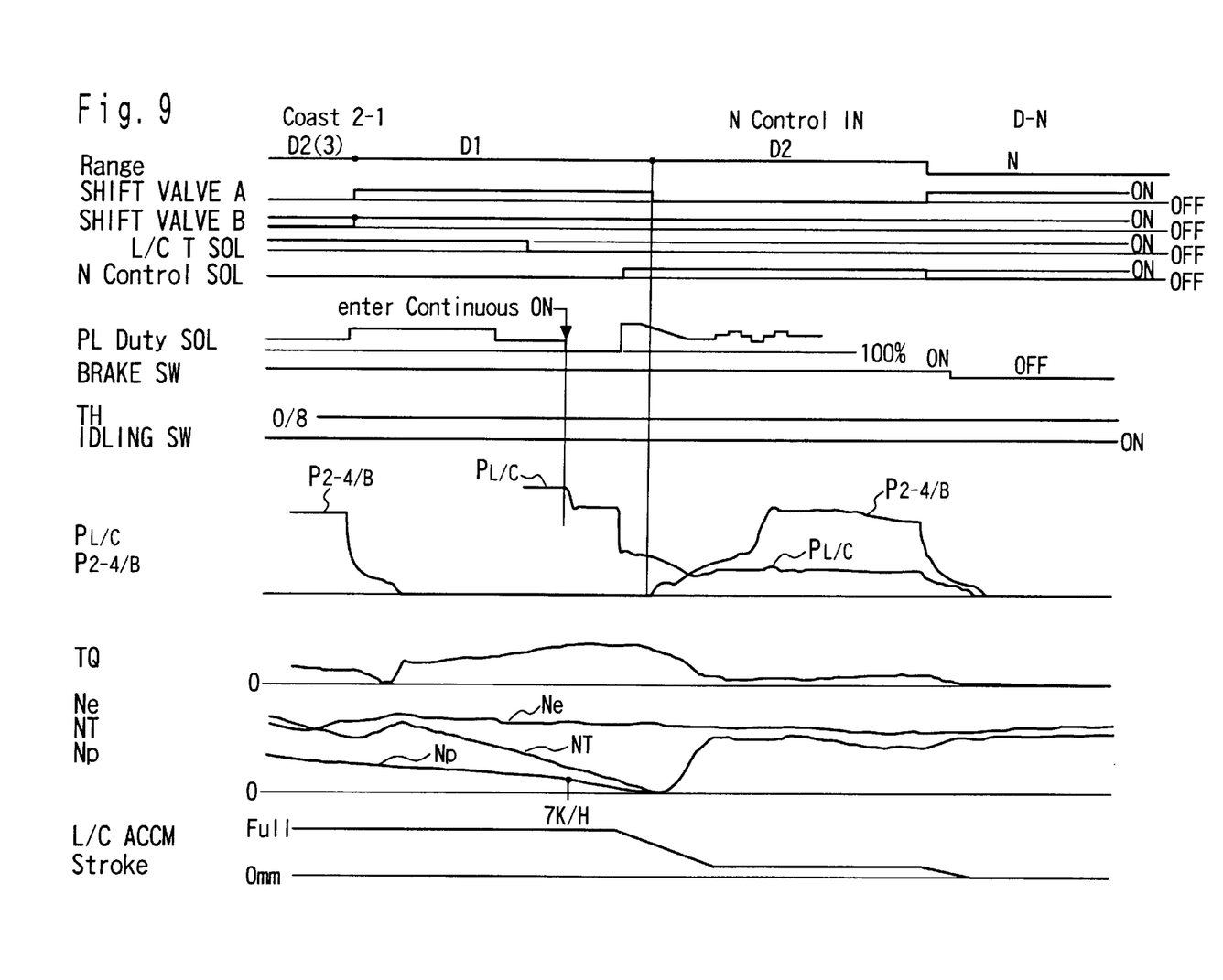
FIG. 9 is a time chart of neutral control performed upon a change from D range to N range when the vehicle is stopped.

Referring next to a timing chart of FIG. 9, there will be described one example of neutral control that is performed when the selector lever is operated from the D range to the N range upon stop of the vehicle with the accelerator pedal being released and the brake pedal being depressed. This neutral control is performed in the D-range region so as to avoid shocks upon selecting from the D range to the N range.

When the vehicle that has been coasting is stopped, the neutral control solenoid 32 is turned on so as to start neutral control after the low clutch pressure PL/C is lowered for a predetermined time from a point of time by controlling the line pressure duty solenoid 23 at a continuous ON state (duty ratio: 100%) when the rotating speed N of the output shaft of the transmission, or vehicle speed, becomes approximately 7 km/h, for example. The neutral control is performed so that the rotating speed difference ΔN between the engine speed Ne and the turbine speed NT is kept at a constant value, in a similar manner as described above. Once the neutral control is started, shift control is performed at the same time so as to upshift the transmission from the 1st-speed gear position to the 2nd-speed gear position in the D range.

Control Upon Depression of Accelerator Pedal During Neutral Control

Figure 10:
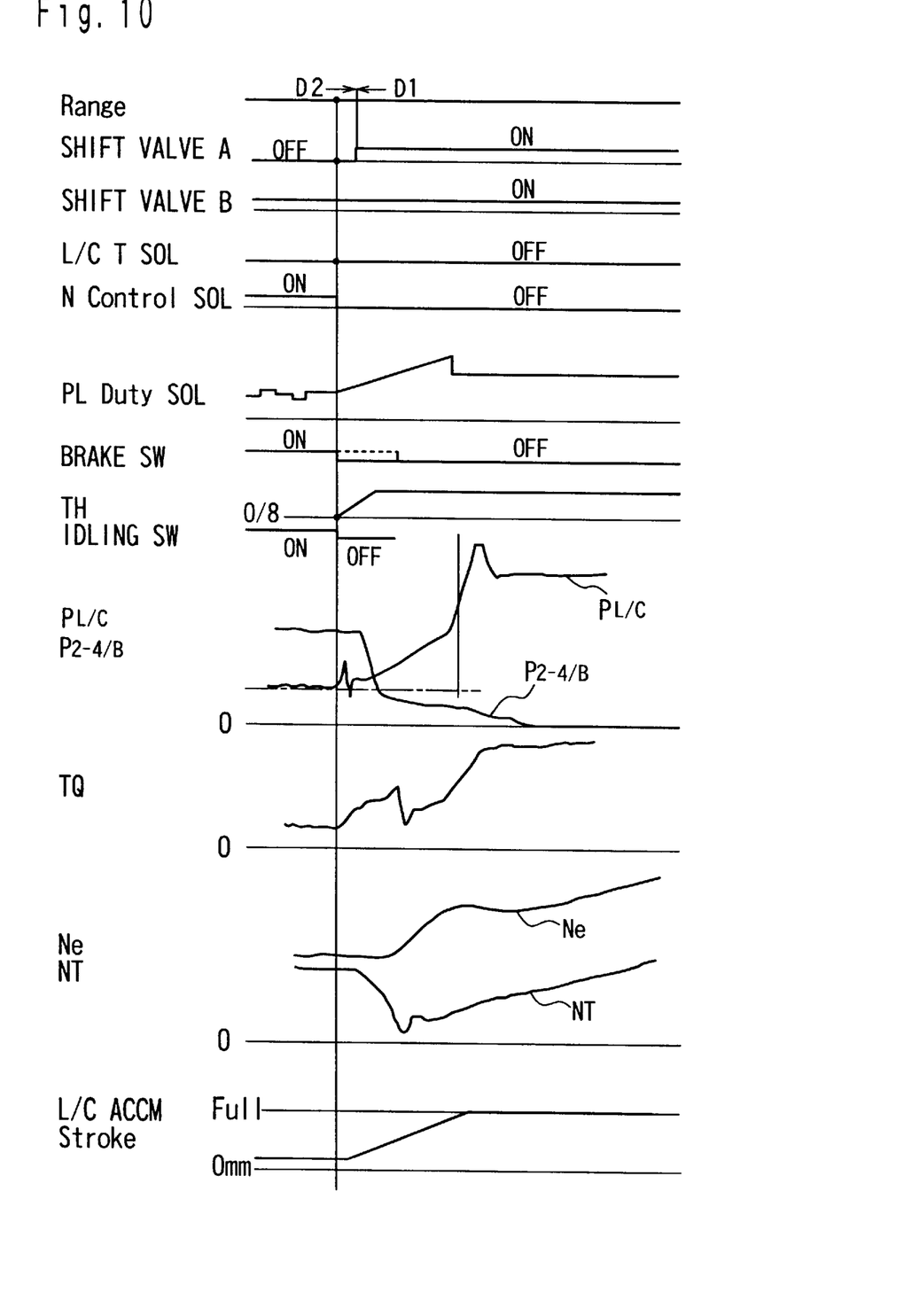
FIG. 10 is a time chart of neutral control performed when the accelerator pedal is depressed.

If an operation to start the vehicle is performed, namely, the accelerator pedal is depressed, during the neutral control in the 2nd-speed gear position of the D range, the neutral control solenoid 32 is turned off at the same time that the idle switch is switched from the ON state to the OFF state as shown in FIG. 10, so that the neutral control is terminated, and normal line pressure control based on the operating angle of accelerator pedal is performed on the line pressure duty solenoid 23. Upon a lapse of a little delay time as counted from the finishing point of the neutral control, the transmission is shifted down from the 2nd-speed gear position to the 1st-speed gear position in the D range, so as to ensure smooth start of the vehicle.

The neutral control device of the automatic transmission of the first embodiment as described above has the following advantageous features.

(1) The valves 3, 5, 6 and solenoid 25 of the accumulator back pressure control system are conventionally used in known transmission systems, and only two components, namely, the neutral control valve 12 and neutral control solenoid 32, are newly added according to the present invention, so that the neutral control can be performed using a relatively small number of components.

(2) The accumulator back pressure has a relatively stable characteristic, namely, provides a low oil-pressure gain as compared with that produced by the known direct driven type valve, and therefore the low clutch pressure PL/C is free from vibrations or variations during the neutral control.

(3) The neutral control valve 12, which serves to switch the low clutch pressure PL/C between the shift valve pressure and the accumulator back pressure, is able to engage the low clutch L/C by feeding the accumulator back pressure to the clutch L/C when the neutral control solenoid 32 fails in the ON state. With this arrangement, the vehicle is sure to run in the 1st-speed, 2nd-speed and 3rd-speed gear position of the D range in which the low clutch L/C is engaged, even in the case of a failure in the operation of the neutral control device.

(4) Since the accumulator control valve (A) 3 of the accumulator back pressure control system controls the accumulator back pressure, using the D range pressure PD produced in the D range as an original pressure, the vehicle is prevented from running when the selected range is one (such as N range) other than the D range, which would occur if the accumulator control valve (A) 3 controls the back pressure based on the line pressure that appears not only in the D range but also in the N range.

(5) The oil pressure that is generated in response to a command to turn on the neutral control solenoid 32 is applied to the neutral control valve 12, in a direction to supply the accumulator back pressure as the low clutch pressure, and the 2-4 brake pressure P2-4/B that is generated in the 4th-speed gear position for releasing the low clutch L/C is applied to the neutral control valve 12, in a direction to supply the shift valve pressure as the low clutch pressure. When the transmission is placed in the 4th-speed gear position, therefore, the control valve 12 is forced to switch to the position for supply of the shift valve pressure due to the force of the oil pressure, thereby preventing the low clutch L/C from being engaged in the 4th-speed gear position due to double failures in the timing solenoid 25 and the neutral control solenoid 32, namely, when the timing solenoid 25 is locked in the OFF state and the neutral control solenoid 32 is locked in the ON state.

(6) Since the accumulator back pressure control means 3, 5, 6 serves as means for controlling the low clutch accumulator 9 provided in the low clutch pressure circuit, the low clutch accumulator 9 functions as a vibration damping accumulator during the neutral control, and thus advantageously reduces vibrations in the hydraulic system.

Second Embodiment

A neutral control device of an automatic transmission according to the second embodiment of the present invention will be described.

Figure 11:
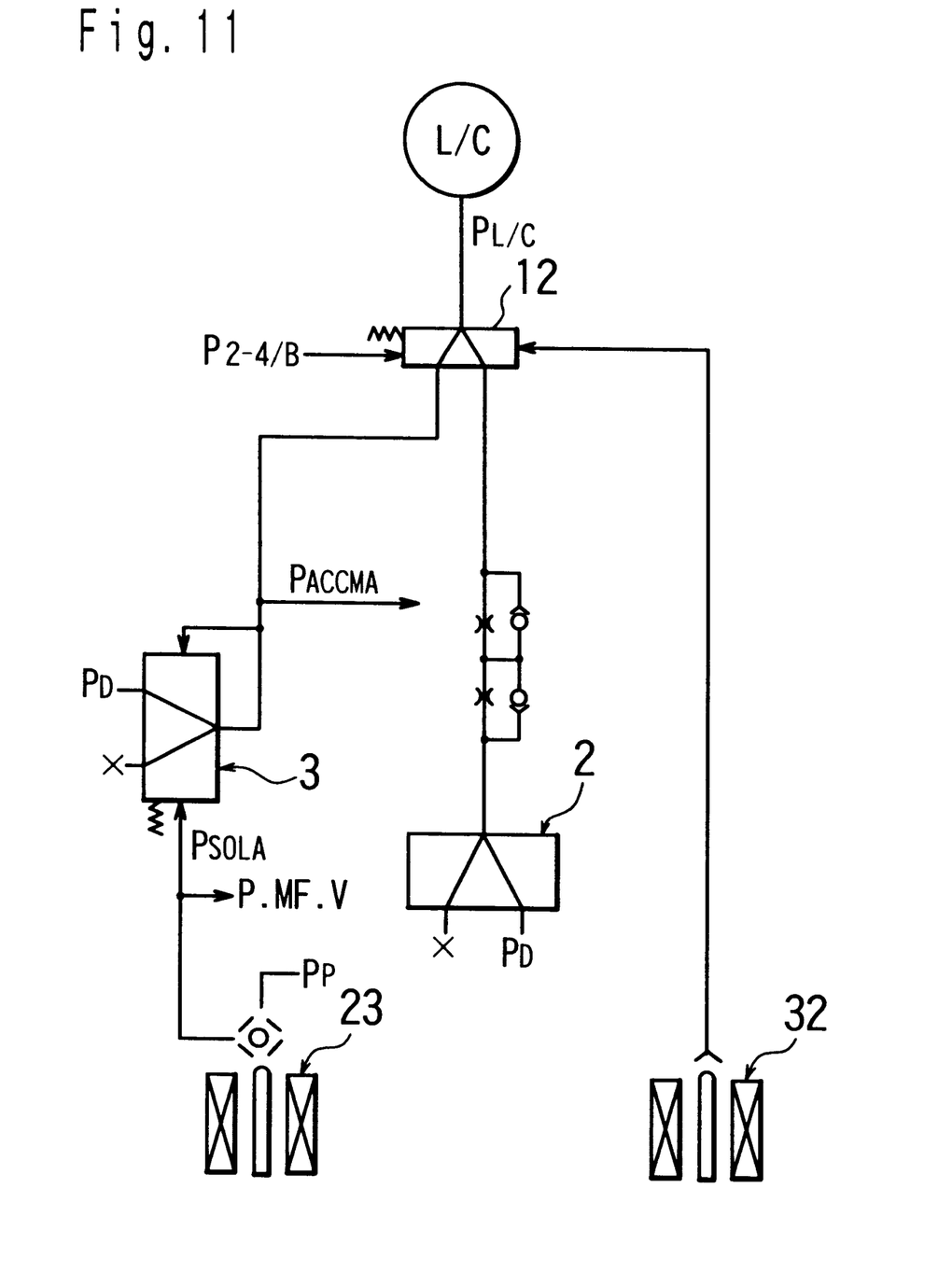
FIG. 11 is a view showing a principal portion of a neutral control device of an automatic transmission according to the second embodiment of the present invention.

Referring to FIG. 11 showing the device of the second embodiment, the low clutch accumulator 9 as used in the first embodiment is eliminated, and the accumulator back pressure control means is provided by the accumulator control valve (A) 3 located in a hydraulic circuit of the high clutch H/C for controlling the back pressure of the high clutch accumulator 11. The neutral control device of the present embodiment has the following advantageous feature.

(7) The low clutch accumulator 9 is eliminated, and the valves 5, 6 and solenoid 25 are also eliminated, resulting in reduced cost and simplified layout of the hydraulic system.

Third Embodiment

A neutral control device of an automatic transmission according to the third embodiment of the present invention will be described.

Figure 12:
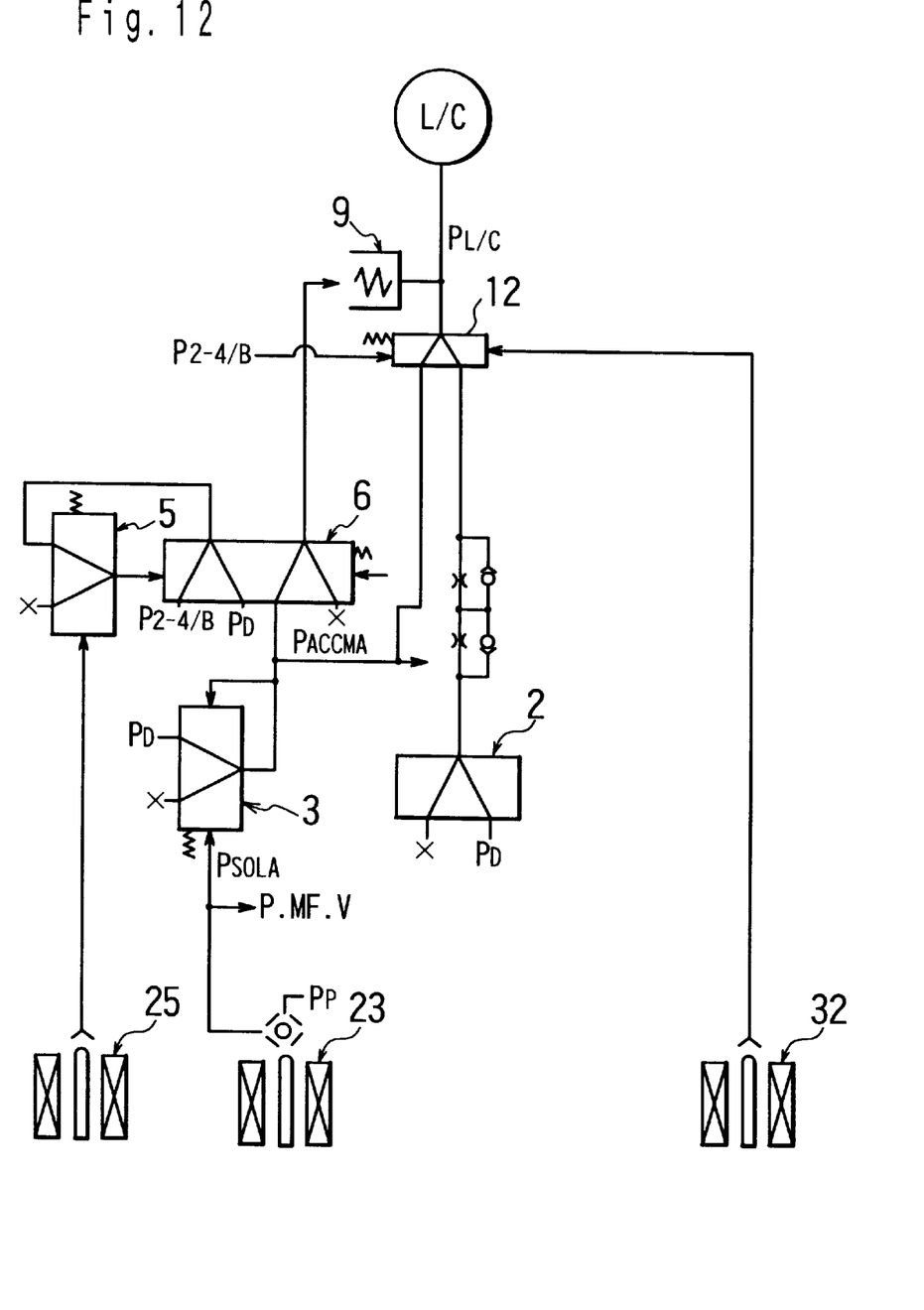
FIG. 12 is a view showing a principal portion of a neutral control device of an automatic transmission according to the third embodiment of the present invention.

In FIG. 12 showing the device of the third embodiment, the low clutch accumulator 9 is provided as in the first embodiment, but the accumulator back pressure control means is provided by the accumulator control valve (A) 3 located in the hydraulic circuit of the high clutch H/C for controlling the back pressure of the high clutch accumulator 11. The neutral control device of the present invention has the following advantageous feature.

(8) Even in the case where the solenoid 25 fails, the neutral control is not affected by the failure in the operation of the solenoid 25, and the low clutch pressure is surely supplied to the low clutch L/C when the 1st-speed, 2nd-speed and 3rd-speed gear positions are established. Thus, the present device provides a fail-safe operation.

Fourth Embodiment

A neutral control device of an automatic transmission according to the fourth embodiment of the present invention will be described.

Figure 13:
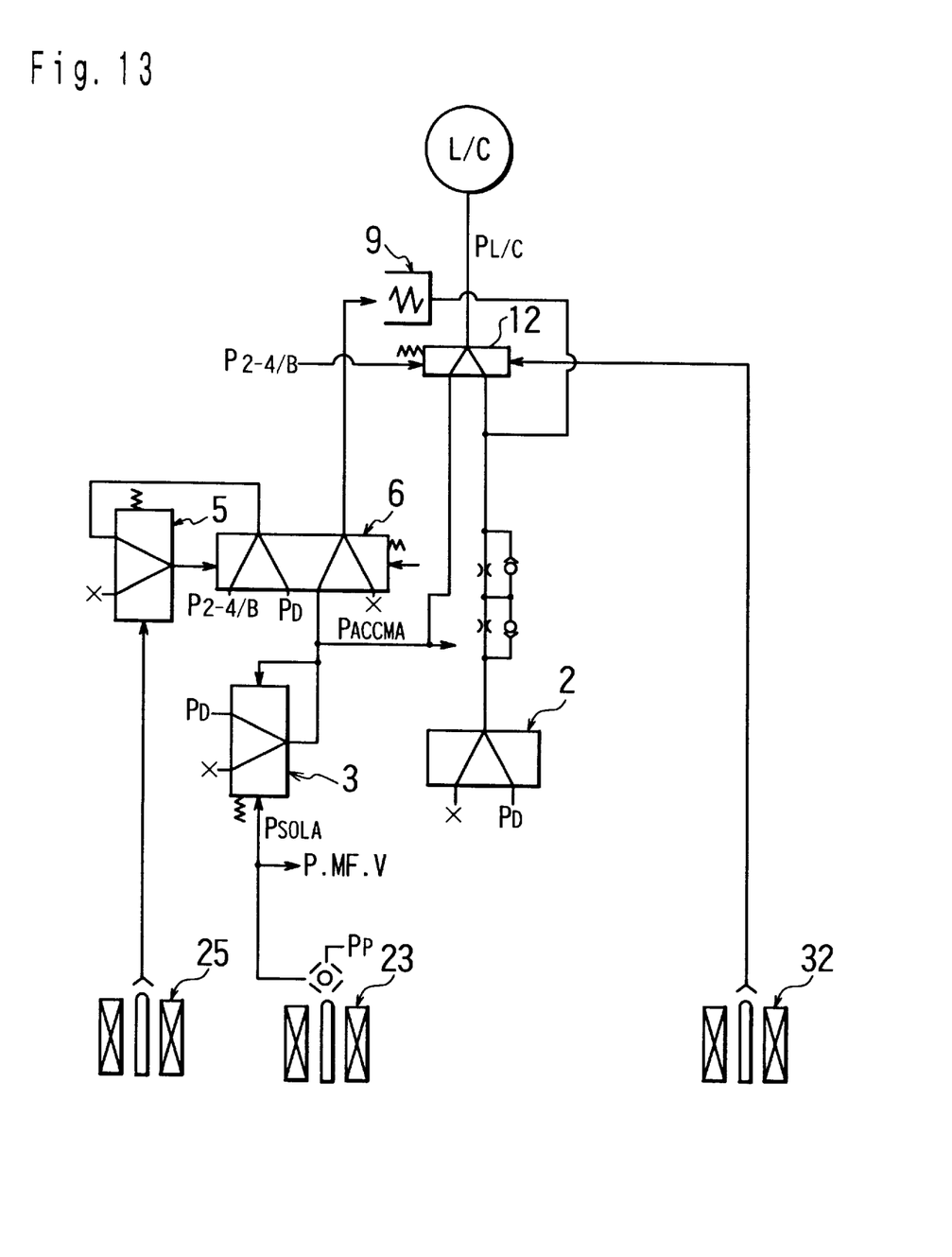
FIG. 13 is a view showing a principal portion of a neutral control device of an automatic transmission according to the fourth embodiment of the present invention.

The neutral control device of the fourth embodiment as shown in FIG. 13 is different from that of the third embodiment in that the low clutch accumulator 9 is located between the shift valve (B) 2 and the neutral control valve 12, namely, at a position upstream of the neutral control valve 12. The fourth embodiment has the following advantageous feature.

(9) The neutral control can be easily performed, without taking account of the operation of the low clutch accumulator 9.

The neutral control device of the present invention is not limitedly applied to the automatic transmissions as shown in the first to fourth embodiments, but may be applied to other automatic transmissions including accumulator back pressure control systems other than those of the illustrated embodiments, or those including additional accumulator back pressure control systems.

What is claimed is:

1. A neutral control device of an automatic transmission comprising:

a forward-drive engaging element that is engaged when a hydraulic pressure is supplied from a shift valve, so as to place the transmission in at least a 1$^{st}$-speed gear position of a forward-drive range;

neutral control means for controlling the hydraulic pressure to be supplied to said forward-drive engaging element, so as to establish a neutral condition by slipping the forward-drive engaging element in the forward-drive range, while an accelerator pedal is released during a range selecting operation to start a vehicle, or during a braking operation to stop the vehicle;

wherein the neutral control means includes:

a neutral control switch valve located in a hydraulic circuit that connects said forward-drive engaging element and said shift valve, for allowing a selected one of a pressure from the shift valve and an accumulator back pressure to be supplied to the forward-drive element;

a first actuator that operates to produce an oil pressure in response to a control command from a controller;

accumulator back pressure control means for controlling the accumulator back pressure, using a forward-drive range pressure as an original pressure, and the oil pressure produced by said first actuator as a signal pressure; and a second actuator that operates in response to an ON/OFF command from the controller, so as to perform switching of said neutral control switch valve.

2. A neutral control device of an automatic transmission according to claim 1, wherein an oil pressure generated in response to an ON command to said second actuator is applied to the neutral control switch valve, so that the accumulator back pressure is supplied to the forward-drive engaging element, and an oil pressure generated in a gear position in which the forward-drive engaging element is released is applied to the neutral control switch valve, so that the pressure of the shift valve is supplied to the forward-drive engaging element.

3. A neutral control device of an automatic transmission according to claim 1 or 2, further comprising an accumulator that is located between said neutral control switch valve and said forward-drive engaging element, and wherein said accumulator back pressure control means controls a back pressure of said accumulator.

4. A neutral control device of an automatic transmission according to claim 1 or claim 2, further comprising an accumulator that is located in a hydraulic circuit that is connected to an engaging element other than said forward-drive engaging element, and wherein said accumulator back pressure control means controls a back pressure of said accumulator.

5. A neutral control device of an automatic transmission according to claim 1 or claim 2, further comprising:

a first accumulator that is located between said neutral control switch valve and said forward-drive engaging element, and a second accumulator provided in a hydraulic circuit connected to an engaging element other than said forward-drive engaging element, said accumulator back pressure control means controlling a back pressure of the second accumulator.

6. A neutral control device of an automatic transmission according to claim 1 or claim 2, further comprising:

a first accumulator that is located between said shift valve and said neutral control switch valve, and a second accumulator provided in a hydraulic circuit connected to an engaging element other than said forward-drive engaging element, said accumulator back pressure control means controlling a back pressure of the second accumulator.

* * * * *